Patented Aug. 26, 1924.

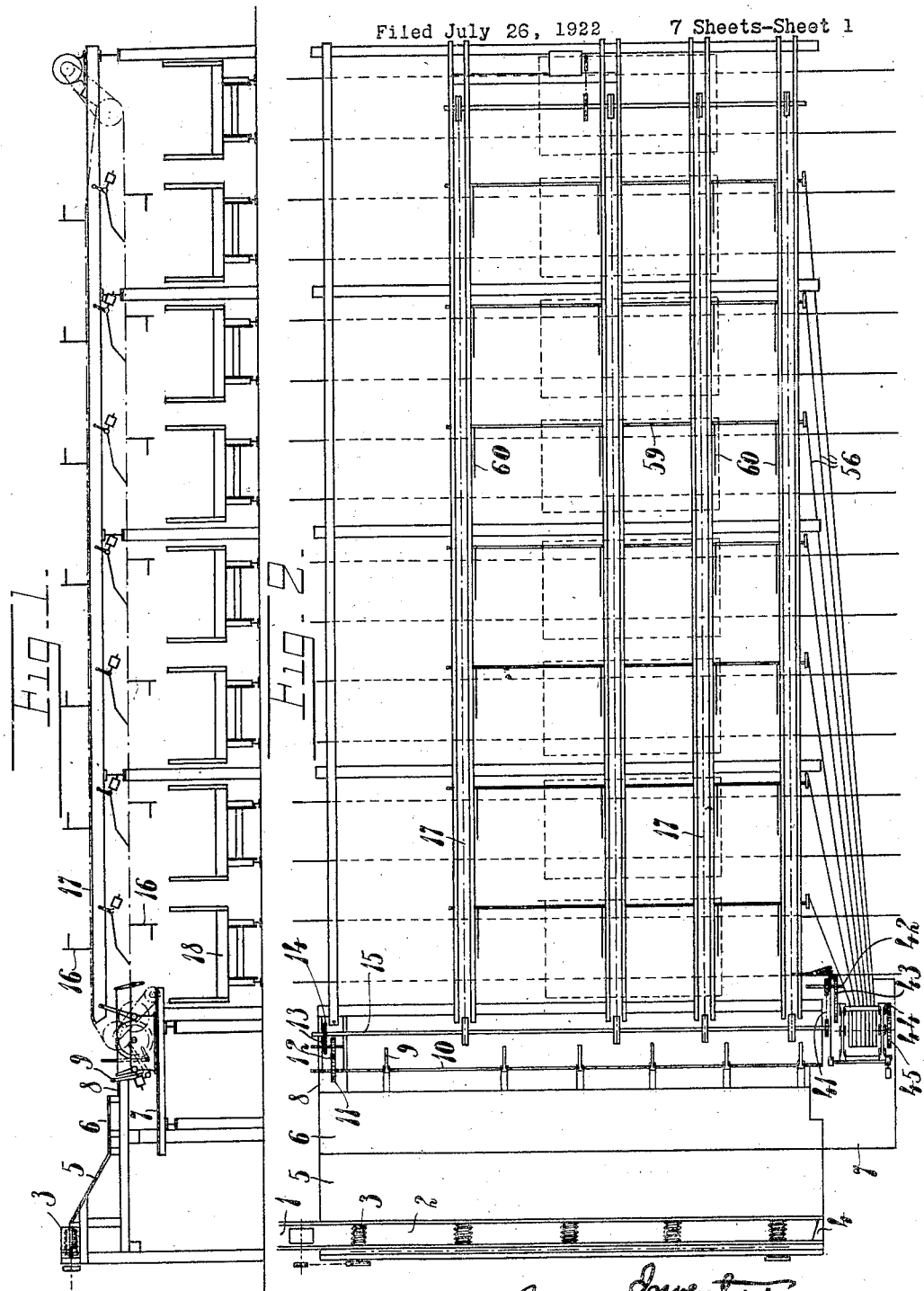

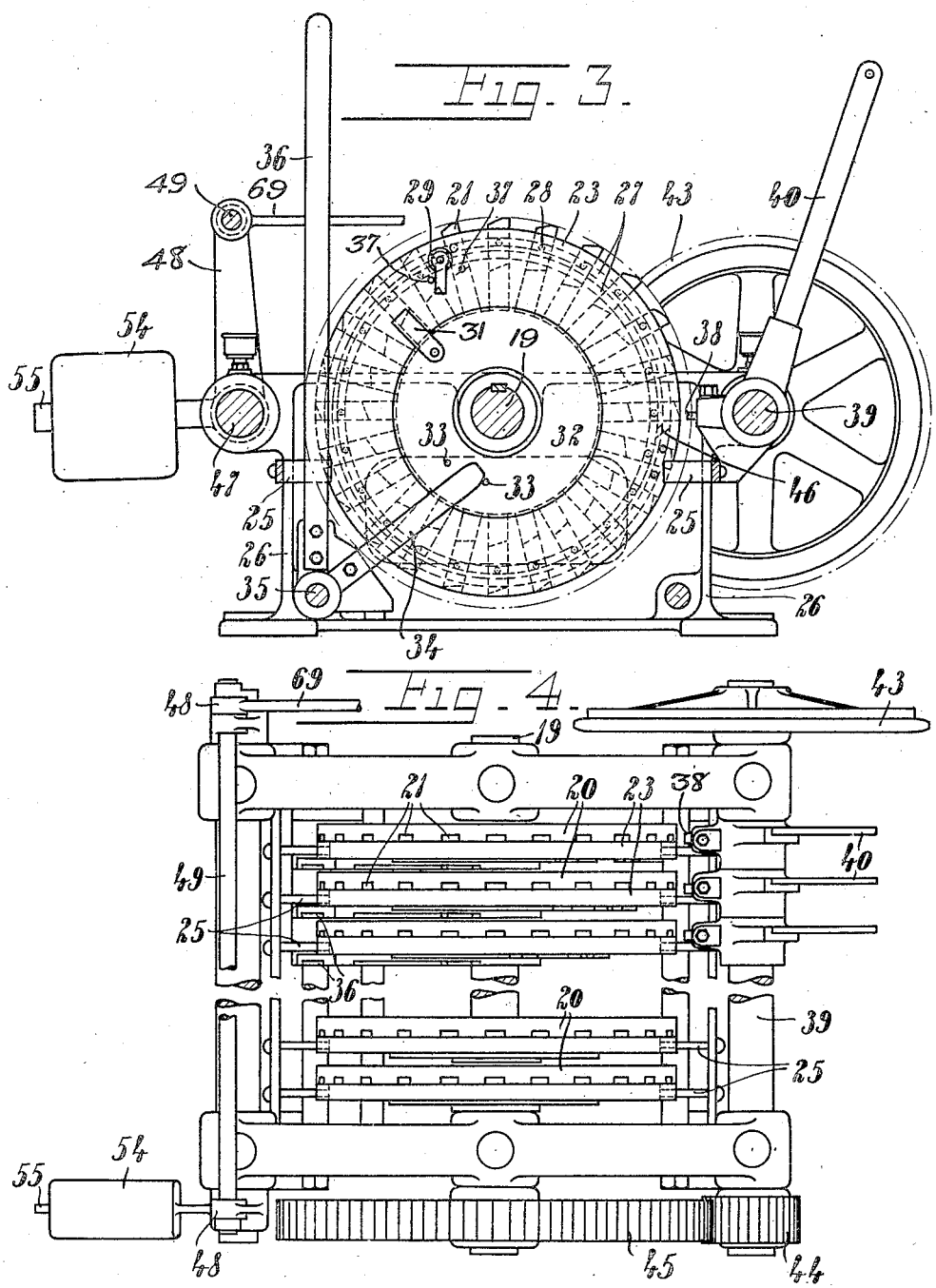

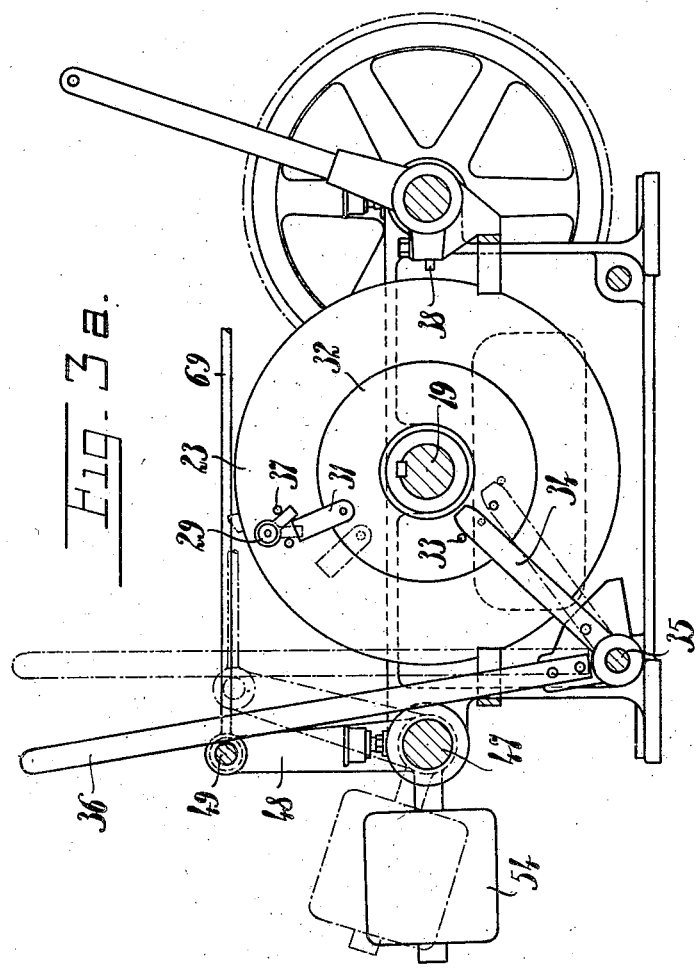

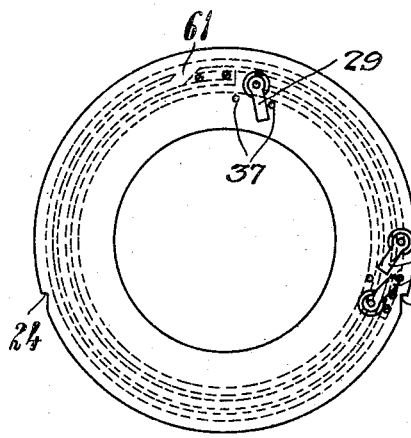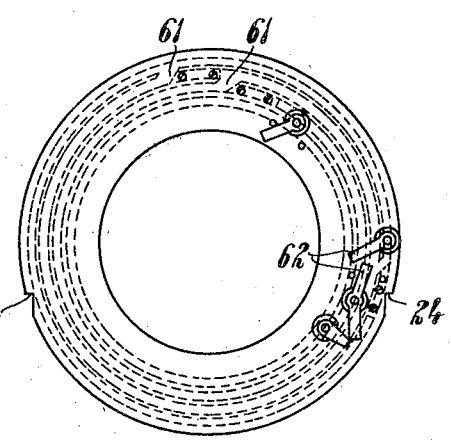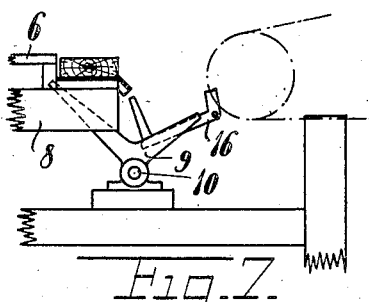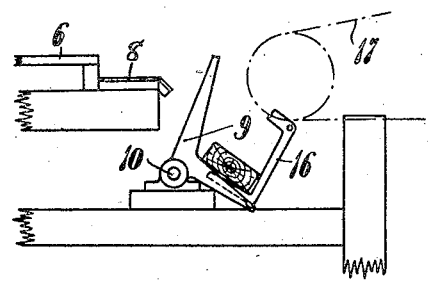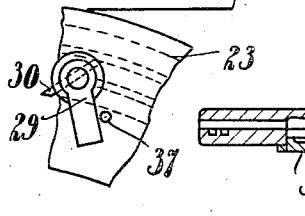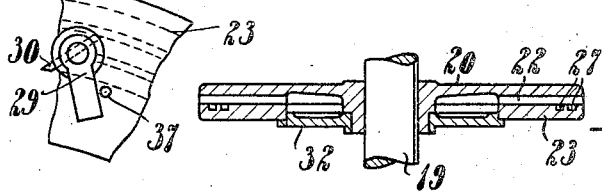

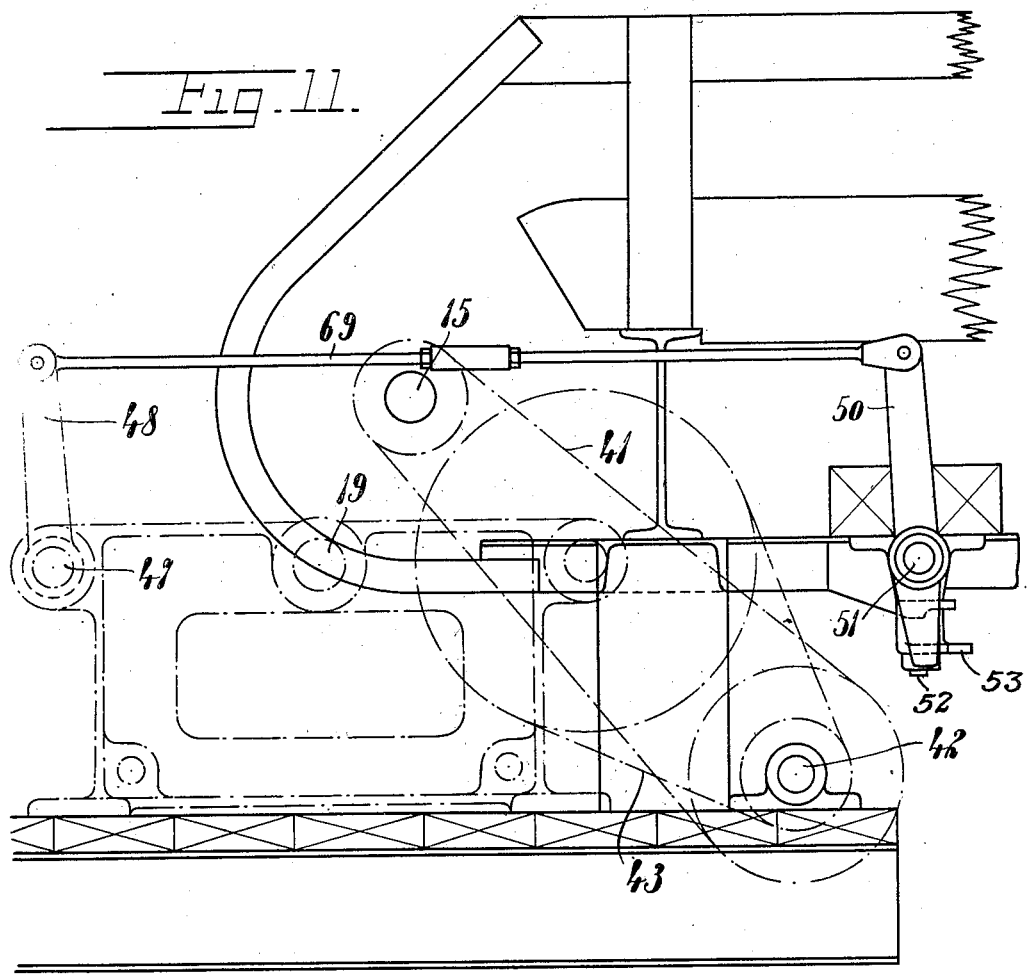

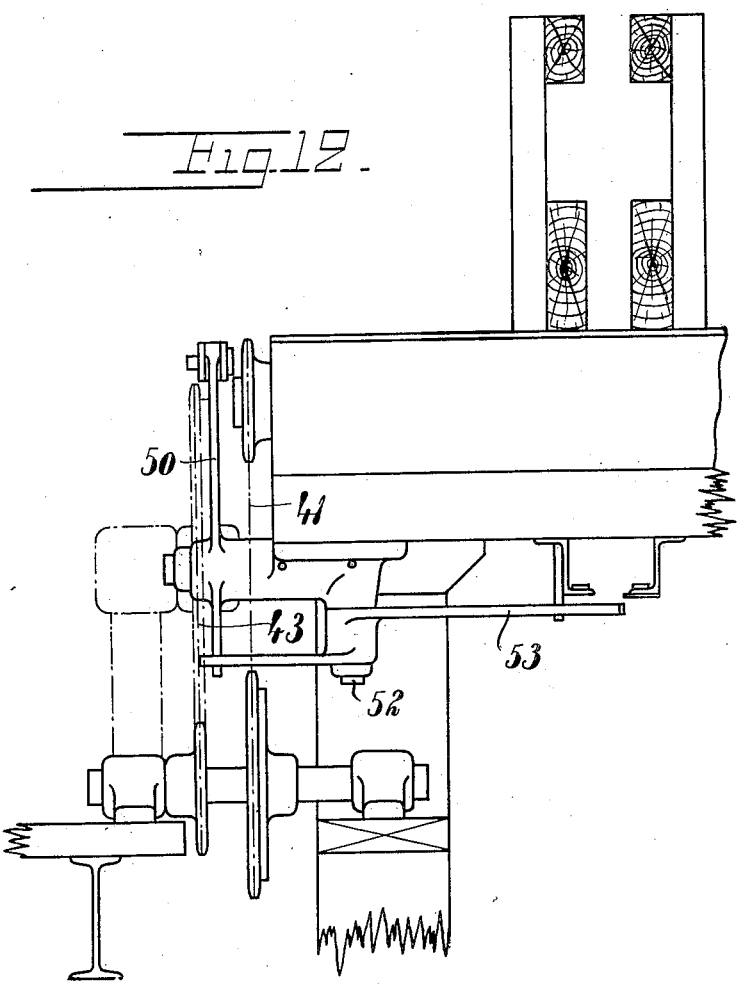

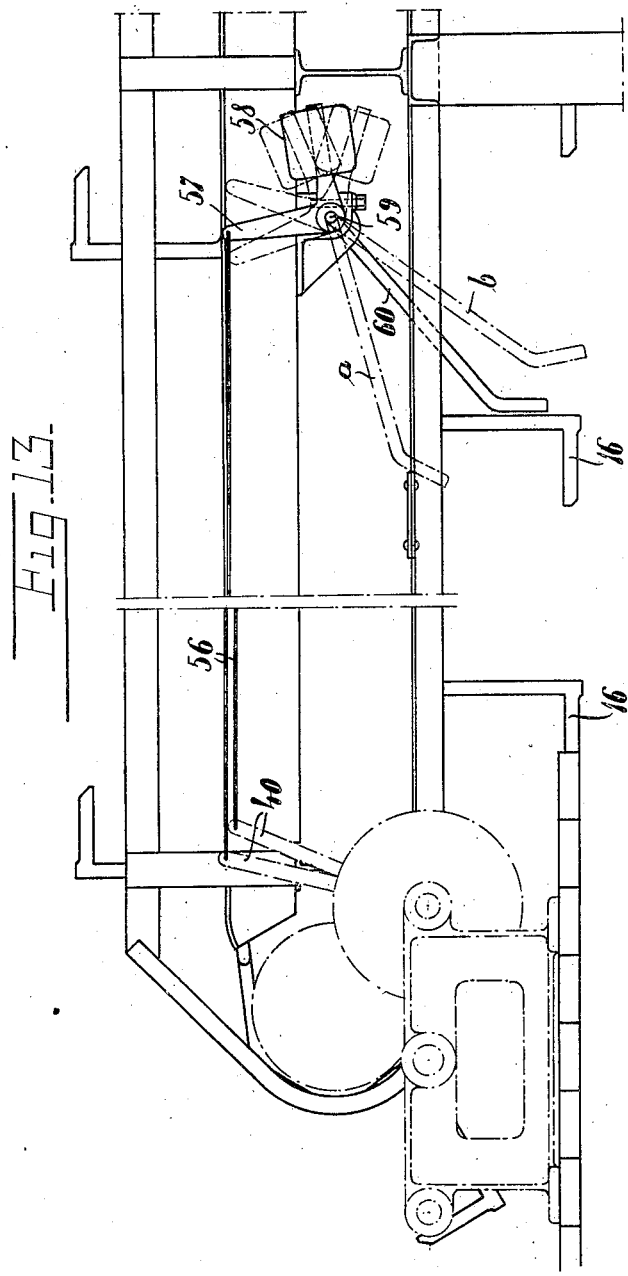

1,506,657

UNITED STATES PATENT OFFICE.

LEON NORDSTRÖM AND KARL EINAR RUPERT LÖFGREN, OF STOCKHOLM, SWEDEN.

LUMBER-SORTING DEVICE.

Application filed July 26, 1922. Serial No. 577,637.

*To all whom it may concern:*

Be it known that we, LEON NORDSTRÖM and KARL EINAR RUPERT LÖFGREN, subjects of the King of Sweden, whose post-office addresses are Stockholm, Sweden, have invented new and useful Improvements in Lumber-Sorting Devices, of which the following is a specification.

This invention relates to lumber sorting devices and more especially to such lumber sorting devices in which the lumber is transported by means of endless chains arranged parallelly to each other, the endless chains being provided with hooks by which the lumber is transported from a sorting place into various collecting places or compartments.

The object of the invention is to provide an operating device by means of which the sorting man can determine the collecting place or compartment in which a deal or the like is to be discharged so that when the said deal or the like reaches the collecting place thus determined a discharging device will be automatically moved to working position, so as to discharge the deal from the carrier.

The invention consists chiefly in the combination with a lumber sorting device of the kind set forth above of a number of discharging devices provided at the various collecting places and an operating device comprising a number of rotary discs adapted to be rotated at a speed proportional to the speed of movement of the chains and each provided with a plurality of movable teeth adapted to operate the said discharging devices, and means for moving the said teeth into or out of operative position, all as will be more particularly described herebelow with reference to the accompanying drawings showing one embodiment of the invention.

Now referring to the drawings, Figs. 1 and 2 show a side view and a plan view respectively of a lumber sorting device. Figs. 3 and 4 show on a larger scale a vertical section and a plan view respectively of the operating device. Fig. 3ª is a view corresponding to Fig. 3 and illustrating the different positions of a hand lever of the operating mechanism. Figs. 5 and 6 show two different forms of the grooved discs used in the operating mechanism. Fig. 7 shows on a larger scale a portion of such a disc. Fig. 8 shows an axial section through a set of discs of the operating device. Figs. 9 and 10 show in different positions an arm for charging the lumber onto the carrier hooks. Figs. 11 and 12 show in views at right angles to each other the driving gear of the sorting plant and Fig. 13 shows on a smaller scale a discharging arm and its connection with the operating device.

1 (Fig. 2) indicates a transporting device, for instance an endless belt by which the lumber is transported to a runway 2 the rollers 3 of which may be driven in any suitable manner and which are screw-threaded. When the lumber strikes a stop 4 it will be forced sideways by the screw thread on rollers 3 onto an inclined plane 5 on which it will slide down onto a sorting table 6 on which the sorting man, standing on a platform 7, sorts the lumber and places the same on a table 8 provided below the sorting table. Here the lumber will be grasped by angle arms 9 (compare Figs. 9 and 10) secured to a shaft 10 which by means of gears 11, 12, 13, 14 (Fig. 2) is driven from a shaft 15 and by said arms the lumber is carried to the carrier hooks 16 which are secured to or made integral with the links of the endless conveyor chains 17 of a runway. The arms 9 rotate continuously with the shaft 10, passing during their rotation through slots 8ª in the table 8, and they rotate in synchronism with the movement of the conveyor chains 17. The said hooks carry the lumber to various collecting places or compartments where in well known manner may be placed cars 18 onto which the lumber drops. Immediately as a deal or the like has been placed on the table 8 the sorting man determines by means of the operating device the collecting place in which the said deal shall be discharged.

In the embodiment shown the said operating device is constructed as follows (Figs. 3 to 8). On a rotary shaft 19 are secured discs 20 the number of which corresponds to the number of collecting places. Each of said discs is provided with a plurality of teeth 21 which are movable in radial slots 22 (Fig. 8) provided in the disc. Bearing against one side of each disc 20 is an annular disc 23 formed at the circumference with notches 24 (Figs. 5 and 6) engaged by arms 25 provided on the frame 26, said arms 25 preventing the discs 23 from being rotated. Each disc 23 is formed in the side bearing against the respective disc 20 with two or more annular guiding grooves 27, in which engage pins 28 supported by the teeth 21. When the said pins engage the inner guiding groove 27, the teeth are kept in a position in which they do not extend beyond the circumference of the respective disc 20. By means of a rocking piece 29 provided on each disc 23 and having a rib 30 (Fig. 7) which in the position of the rocking piece 29 shown in Fig. 3 forms a portion of the wall separating the two annular grooves 27 from each other, it is possible to compel the pin 28 of a tooth 21 to move from the inner to the outer groove 27 whereby the tooth will be forced into a position in which it extends beyond the circumference of the disc 20. For this purpose it is only necessary to bring the rocking piece 29 into the position shown in Fig. 5 in which the rib 30 thereof cuts off the path formed by the inner annular groove 27 and at the same time leaves an entrance for the pin 28 of a tooth into the outer groove 27. The adjustment of the rocking piece 29 is effected by means of an arm 31 of a disc 32 pivotally journalled on the hub of the respective disc 20, the said disc being provided with two projections or pins 33 arranged at a distance from each other, an arm 34 rigidly secured to a hand lever 36 pivotally journalled on a shaft 35 entering between said projections or pins 33. When the said lever 36 is moved to the left in Fig. 3, the arm 34 turns the disc 32 to the right causing the arm 31 to move the rocking piece 29 from the position shown in Fig. 3 to the position shown in Fig. 5. The movement of the rocking piece 29 is limited by two projections or pins 37. As soon as the rocking piece 29 has been moved in the manner just described, the tooth 21 nearest to the left of the rocking piece 29, supposing the discs 20 are rotating, will be moved outwards, its pin 28 sliding along the rib 30 of the rocking piece 29, into the outer annular groove 27 of the disc 20, at the same time turning the rocking piece back into its original position. When the disc 20 has turned through a certain angle the tooth pushed out will come into engagement with the one end 38 of an angle lever 40 pivotally journalled on a shaft 39, and turn the said lever 40 causing the same to operate a discharging device described herebelow. The shaft 19 which is driven from the shaft 15 (Fig. 2) for instance by means of a belt or chain gear 41, a shaft 42, a belt or chain gear 43, the shaft 31 and a toothed gear 44, 45 rotates at such a speed that the discs 20 rotate through an angle corresponding to the distance between two adjacent teeth in one and the same disc during the same time as that time during which a carrier hook 16 moves a distance corresponding to the distance between two adjacent hooks 16 of a chain 17. The distance between two such hooks corresponds in its turn to the distance between two adjacent collecting places. In each disc 23 is a connecting groove 46 through which a pin 28 sliding in the outer groove 27 moves into the inner groove 27 and thereby compels its tooth to move into its inner or idle position. The said connecting groove is arranged in such a position relatively to the end 38 of the angle lever 40 that the tooth will be moved inwards after it has actuated the angle lever 40. The rocket piece 29 of the various discs 23 is placed in different positions in accordance with the collecting place to which it corresponds. For instance, the rocking piece of the disc 23, corresponding to the fifth collecting place counting from the operating device, is placed at such a distance from the angle lever 38 that the corresponding disc 20 has to rotate through an angle corresponding to five teeth before a tooth pushed out by the rocking piece 29 will engage the angle lever 40. Immediately after the rocking piece 29 compels a tooth to move outwards, the hand lever 36 and thereby the disc 32 are returned into their initial positions by means of the following device. On a shaft 47 parallel with the shaft 19 two arms 48 are secured. These arms are connected to each other at their free ends by means of a rod 49 extending along the whole set of hand levers 36. The one of the arms 48 is connected by means of a rod 69 to the one end of a two-armed lever 50 pivotally mounted on a horizontal pin 51 (Figs. 11 and 12). The other end of said lever reaches into the path of the one end of a two-armed lever 53 pivoted on a vertical pin 52, the other end of said lever 53 reaching into the path of the carrier hooks of one of the transporting chains. As soon as a carrier hook strikes the lever 53, the latter and thus the lever 50 and the arms 48 will be turned, the rod 49 thereby returning into the idle position (Fig. 3) the hand lever 36 that was temporarily turned to the left in Fig. 3. As soon as the carrier hook has passed by the lever 36, the levers 53, 50 and the arms 48 are returned into the idle position by means of a weight 54 provided on an arm 55 which is rigidly secured to one of the arms 48.

Each angle lever 40 is by means of a wire 56 or the like connected to an angle lever 57 (Fig. 13) at the corresponding collecting place, said angle lever 57 being provided with a weight 58 and secured to a rotary shaft 59 having a number of discharging arms 60 (compare Fig. 2). When an angle lever 40 is actuated by the corresponding disc 20, it rotates by means of the wire 56 and the angle lever 57 the shaft 59 whereby the discharging arms 60 will be swung from the position a (Fig. 13) to the position b in which said arms will be in the path of the lumber carried by the hooks 16. This movement of the discharging arms takes place immediately before the lumber piece to be discharged at the collecting place in question reaches the position $b$ of the discharging arms 60. As soon as the lumber strikes the arms 60 it is pushed down from the hooks 16, whereupon the discharging arms 60 and the angle levers 40 return into their idle positions under the influence of the weight 58.

If the number of collecting places is larger than the number of teeth of the discs 20 the fixed discs 23 may, as is shown in Figs. 5 and 6, be formed with three or more concentric grooves 27 for the pins 28 of the teeth 21. The rocking piece 29 in this case is placed in such a position that it causes the pins 28 to move from the innermost groove to the next outer groove while the movement of the pins from the latter groove to the next one is effected by a connecting groove 61. As will be easily understood, a disc 20 in this case must make one or more revolutions before a tooth actuated by the rocking piece reaches its outer or working position, the length and position of the tooth being such that the tooth does not reach its outer position until its pin 28 comes into engagement with the outermost groove 27. For returning a tooth into its innermost position special rocking pieces 62 of the same construction as the rocking pieces 29 may be used.

Having now described our invention, what we claim is:—

1. The combination with a lumber sorting plant comprising a sorting place, a plurality of collecting places or compartments, and endless conveyor chains running between said sorting place and said collecting places, of discharging devices at said collecting places, an operating device comprising rotary discs the number of which corresponds to the number of collecting places, movable teeth on said rotary discs, and means for actuating said discharging means by said teeth, substantially as and for the purpose set forth.

2. The combination with a lumber sorting plant comprising a sorting place, a plurality of collecting places or compartments and endless conveyor chains running between said sorting place and said collecting places, of discharging devices at said collecting places, an operating device comprising rotary discs the number of which corresponds to the number of collecting places, a plurality of movable teeth on each of said rotary discs, a plurality of pivotally journalled angle levers, one for each disc, adapted to be actuated by said teeth, and connections between said angle levers and said discharging devices, substantially as and for the purpose set forth.

3. The combination with a lumber sorting plant comprising a sorting place, a plurality of collecting places or compartments, endless conveyor chains running between said sorting place and said discharging places, and hooks on said chains, of an operating device comprising a plurality of rotary discs, radially movable teeth on said discs, a plurality of pivotally journalled angle levers, one for each disc, adapted to be actuated by said teeth, means for moving said teeth into and out of operative position, swingable discharging arms at the said collecting places, and means interconnecting said angle levers and said discharging arms, substantially as and for the purpose set forth.

4. The combination with a lumber sorting plant comprising a sorting place, a plurality of collecting places or compartments, endless conveyor chains running between said sorting place and said collecting places and hooks on said chains adapted to carry the lumber, of an operating device comprising a plurality of rotary discs, radially movable teeth on said discs, means for moving said teeth into and out of operative position, hand levers for actuating said means for moving the teeth, a plurality of pivotally journalled angle levers adapted to be actuated by said teeth, swingable discharging arms at the said collecting places, and means interconnecting said angle levers and said discharging arms, substantially as and for the purpose set forth.

In testimony whereof we have signed our names.

LEON NORDSTRÖM.
KARL EINAR RUPERT LÖFGREN.